US009443204B2

(12) United States Patent
Vasseur et al.

(10) Patent No.: US 9,443,204 B2
(45) Date of Patent: Sep. 13, 2016

(54) DISTRIBUTED ARCHITECTURE FOR MACHINE LEARNING BASED COMPUTATION USING A DECISION CONTROL POINT

(71) Applicant: Cisco Technology, Inc., San Jose, CA (US)

(72) Inventors: Jean-Philippe Vasseur, Saint Martin d'Uriage (FR); Grégory Mermoud, Veyras (CH); Sukrit Dasgupta, Norwood, MA (US)

(73) Assignee: Cisco Technology, Inc., San Jose, CA (US)

( * ) Notice: Subject to any disclaimer, the term of this patent is extended or adjusted under 35 U.S.C. 154(b) by 250 days.

(21) Appl. No.: 13/954,230

(22) Filed: Jul. 30, 2013

(65) Prior Publication Data

US 2014/0222730 A1    Aug. 7, 2014

Related U.S. Application Data

(60) Provisional application No. 61/761,132, filed on Feb. 5, 2013.

(51) Int. Cl.
*G06N 99/00* (2010.01)
*H04L 29/08* (2006.01)
*G06F 11/34* (2006.01)

(52) U.S. Cl.
CPC ......... *G06N 99/005* (2013.01); *G06F 11/3433* (2013.01); *H04L 67/1029* (2013.01)

(58) Field of Classification Search
None
See application file for complete search history.

(56) References Cited

U.S. PATENT DOCUMENTS

| 6,118,791 | A  |   | 9/2000  | Fichou et al. |
|-----------|-----|---|---------|---------------|
| 7,721,061 | B1 | * | 5/2010  | Kelly et al. ............... 711/167 |
| 8,254,271 | B1 |   | 8/2012  | Nadeau et al. |
| 2002/0133575 | A1 |   | 9/2002  | Cidon et al. |
| 2003/0021252 | A1 |   | 1/2003  | Harper et al. |
| 2008/0102793 | A1 | * | 5/2008  | Ananthanarayanan H04W 12/04 455/411 |
| 2009/0210360 | A1 | * | 8/2009  | Sankar et al. ............... 706/10 |
| 2012/0124430 | A1 |   | 5/2012  | Dharmasanam et al. |
| 2012/0155260 | A1 | * | 6/2012  | Vasseur ............... H04L 47/125 370/230.1 |
| 2012/0317578 | A1 | * | 12/2012 | Kansal ............... G06F 9/5077 718/104 |
| 2012/0324245 | A1 | * | 12/2012 | Sinha ............... G06F 21/81 713/300 |
| 2013/0031253 | A1 | * | 1/2013  | Hui ............... H04L 43/0811 709/225 |
| 2014/0006893 | A1 | * | 1/2014  | Shetty ............... H04L 1/1867 714/749 |
| 2014/0184613 | A1 | * | 7/2014  | Exterman ............... G06T 1/20 345/501 |

OTHER PUBLICATIONS

Gondra, "Applying machine learning to software fault-proneness prediction," The Journal of Systems and Software 81 (2008) 186-195.*

(Continued)

*Primary Examiner* — Stanley K Hill
*Assistant Examiner* — Benjamin Buss
(74) *Attorney, Agent, or Firm* — Parker Ibrahim & Berg LLC; James M. Behmke; Stephen D. LeBarron

(57) ABSTRACT

In one embodiment, a request is received from a requesting node in a network to assist in distributing a task of the requesting node. Upon receiving the message, a capability to perform the task of one or more helping nodes in the network is evaluated, and a helping node of the one or more helping nodes is selected to perform the task based on the evaluated capability of the selected helping node. The distribution of the task is then authorized from the requesting node to the selected helping node.

23 Claims, 13 Drawing Sheets

(56) References Cited

OTHER PUBLICATIONS

ZEF, "Message queue-based load balancing" Dec. 19, 2012, In General, Programming.*

Vasseur, et al., "Distrubuted Architecture for Machine Learning Based Computation Using a Decision Control Point", U.S. Appl. No. 61/761,132, filed Feb. 5, 2013, 35 pages, U.S. Patent and Trademark Office.

Vasseur, et al., "Dynamically Adjusting a Set of Monitored Network Properties Using Distributed Learning Machine Feedback", U.S. Appl. No. 13/941,063, filed Jul. 12, 2013, 30 pages, U.S. Patent and Trademark Office.

Winter, et al., "RPL: IPv6 Routing Protocol for Low-Power and Lossy Networks", Request for Comments 6550, Mar. 2012, 157 pages, Internet Engineering Task Force Trust.

* cited by examiner

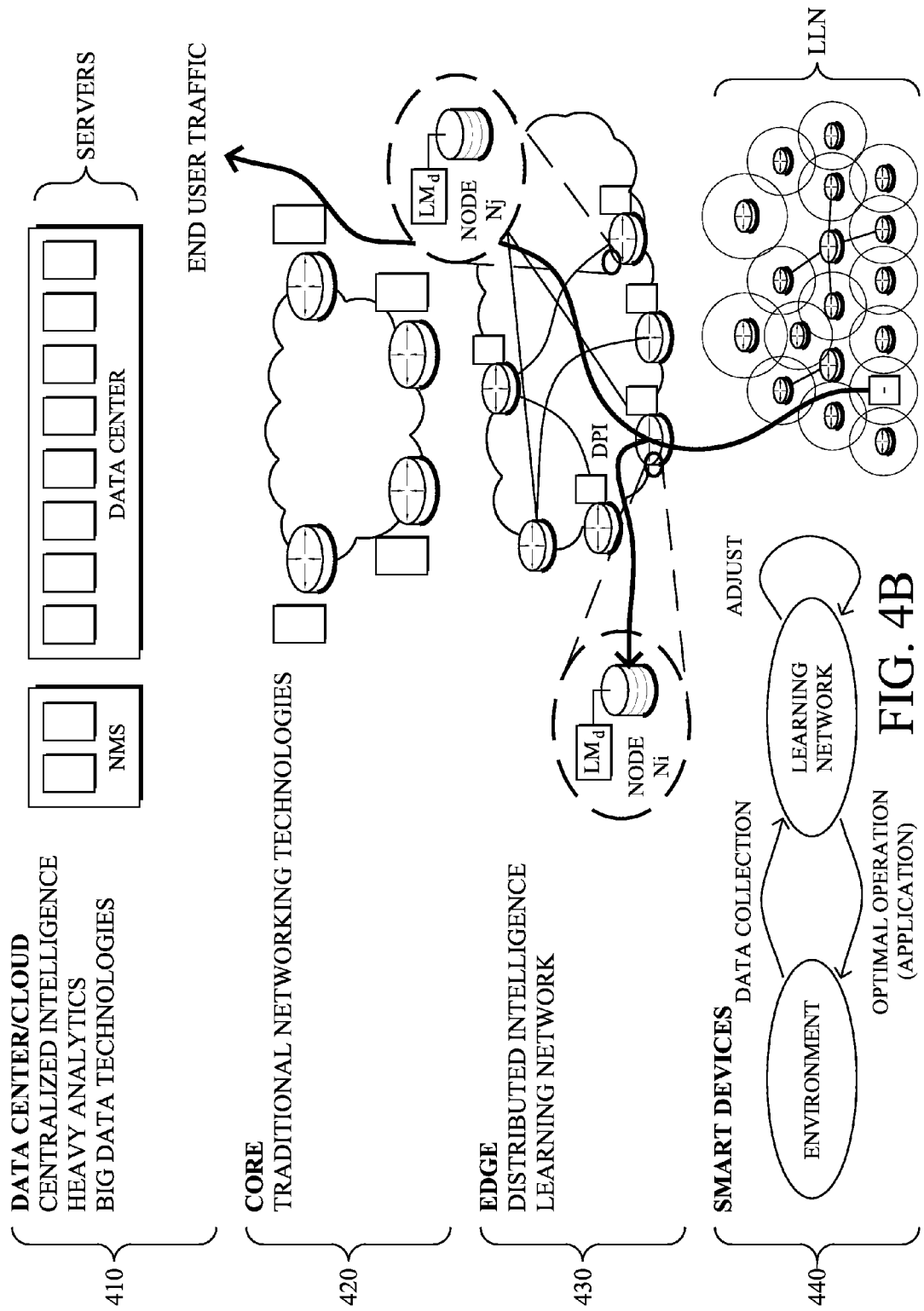

DISTRIBUTED ARCHITECTURE FOR MACHINE LEARNING BASED COMPUTATION USING A DECISION CONTROL POINT

RELATED APPLICATION

The present invention claims priority to U.S. Provisional Application Ser. No. 61/761,132, filed Feb. 5, 2013, entitled "A DISTRIBUTED ARCHITECTURE FOR MACHINE LEARNING BASED COMPUTATION USING A DECISION CONTROL POINT", by Vasseur, et al., the contents of which are incorporated herein by reference.

TECHNICAL FIELD

The present disclosure relates generally to computer networks, and, more particularly, to the use of learning machines within computer networks.

BACKGROUND

Low power and Lossy Networks (LLNs), e.g., Internet of Things (IoT) networks, have a myriad of applications, such as sensor networks, Smart Grids, and Smart Cities. Various challenges are presented with LLNs, such as lossy links, low bandwidth, low quality transceivers, battery operation, low memory and/or processing capability, etc. The challenging nature of these networks is exacerbated by the large number of nodes (an order of magnitude larger than a "classic" IP network), thus making the routing, Quality of Service (QoS), security, network management, and traffic engineering extremely challenging, to mention a few.

Machine learning (ML) is concerned with the design and the development of algorithms that take as input empirical data (such as network statistics and states, and performance indicators), recognize complex patterns in these data, and solve complex problems such as regression (which are usually extremely hard to solve mathematically) thanks to modeling. In general, these patterns and computation of models are then used to make decisions automatically (i.e., close-loop control) or to help make decisions. ML is a very broad discipline used to tackle very different problems (e.g., computer vision, robotics, data mining, search engines, etc.), but the most common tasks are the following: linear and non-linear regression, classification, clustering, dimensionality reduction, anomaly detection, optimization, association rule learning.

One very common pattern among ML algorithms is the use of an underlying model M, whose parameters are optimized for minimizing the cost function associated to M, given the input data. For instance, in the context of classification, the model M may be a straight line that separates the data into two classes such that $M=a*x+b*y+c$ and the cost function would be the number of misclassified points. The ML algorithm then consists in adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data. Note that the example above is an over-simplification of more complicated regression problems that are usually highly multi-dimensional.

Learning Machines (LMs) are computational entities that rely on one or more ML algorithm for performing a task for which they haven't been explicitly programmed to perform. In particular, LMs are capable of adjusting their behavior to their environment (that is, "auto-adapting" without requiring a priori configuring static rules). In the context of LLNs, and more generally in the context of the IoT (or Internet of Everything, IoE), this ability will be very important, as the network will face changing conditions and requirements, and the network will become too large for efficiently management by a network operator. In addition, LLNs in general may significantly differ according to their intended use and deployed environment.

Thus far, LMs have not generally been used in LLNs, despite the overall level of complexity of LLNs, where "classic" approaches (based on known algorithms) are inefficient or when the amount of data cannot be processed by a human to predict network behavior considering the number of parameters to be taken into account.

BRIEF DESCRIPTION OF THE DRAWINGS

The embodiments herein may be better understood by referring to the following description in conjunction with the accompanying drawings in which like reference numerals indicate identically or functionally similar elements, of which:

FIG. 1 illustrates an example communication network;

FIG. 2 illustrates an example network device/node;

FIG. 3 illustrates an example directed acyclic graph (DAG) in the communication network of FIG. 1;

FIGS. 4A-4E illustrate an example learning machine architecture;

FIG. 5 illustrates another example learning machine architecture with an Off-load Computation Selection (OCS) engine;

FIG. 6 illustrates an example message exchange;

FIG. 7 illustrates an example of OCS activity;

FIG. 8 illustrates an example of requestor node activity; and

FIG. 9 illustrates an example simplified procedure for machine learning based computation using a decision control point.

DESCRIPTION OF EXAMPLE EMBODIMENTS

Overview

According to one or more embodiments of the disclosure, techniques are shown and described relating to a distributed architecture for machine learning based computation using a decision control point. In one embodiment, a request is received from a requesting node in a network to assist in distributing a task of the requesting node. Upon receiving the message, a capability to perform the task of one or more helping nodes in the network is evaluated, and a helping node of the one or more helping nodes is selected to perform the task based on the evaluated capability of the selected helping node. The distribution of the task is then authorized from the requesting node to the selected helping node.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE P1901.2, and others. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

Figure 1:
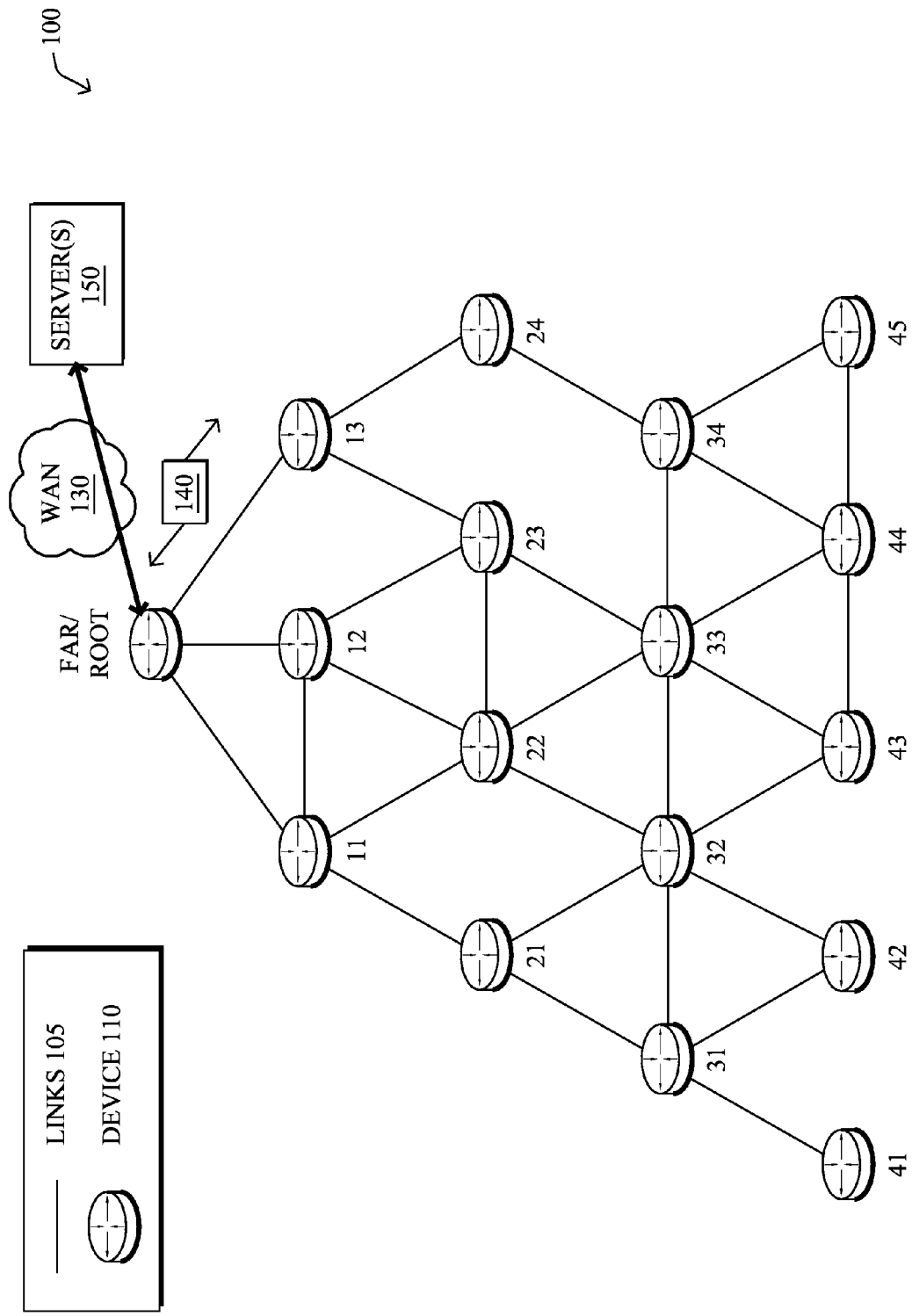

FIG. 1 is a schematic block diagram of an example computer network 100 illustratively comprising nodes/devices 110 (e.g., labeled as shown, "root," "11," "12," . . . "45," and described in FIG. 2 below) interconnected by various methods of communication. For instance, the links 105 may be wired links or shared media (e.g., wireless links, PLC links, etc.) where certain nodes 110, such as, e.g., routers, sensors, computers, etc., may be in communication with other nodes 110, e.g., based on distance, signal strength, current operational status, location, etc. The illustrative root node, such as a field area router (FAR) of a FAN, may interconnect the local network with a WAN 130, which may house one or more other relevant devices such as management devices or servers 150, e.g., a network management server (NMS), a dynamic host configuration protocol (DHCP) server, a constrained application protocol (CoAP) server, etc. Those skilled in the art will understand that any number of nodes, devices, links, etc. may be used in the computer network, and that the view shown herein is for simplicity. Also, those skilled in the art will further understand that while the network is shown in a certain orientation, particularly with a "root" node, the network 100 is merely an example illustration that is not meant to limit the disclosure.

Data packets 140 (e.g., traffic and/or messages) may be exchanged among the nodes/devices of the computer network 100 using predefined network communication protocols such as certain known wired protocols, wireless protocols (e.g., IEEE Std. 802.15.4, WiFi, Bluetooth®, etc.), PLC protocols, or other shared-media protocols where appropriate. In this context, a protocol consists of a set of rules defining how the nodes interact with each other.

Figure 2:
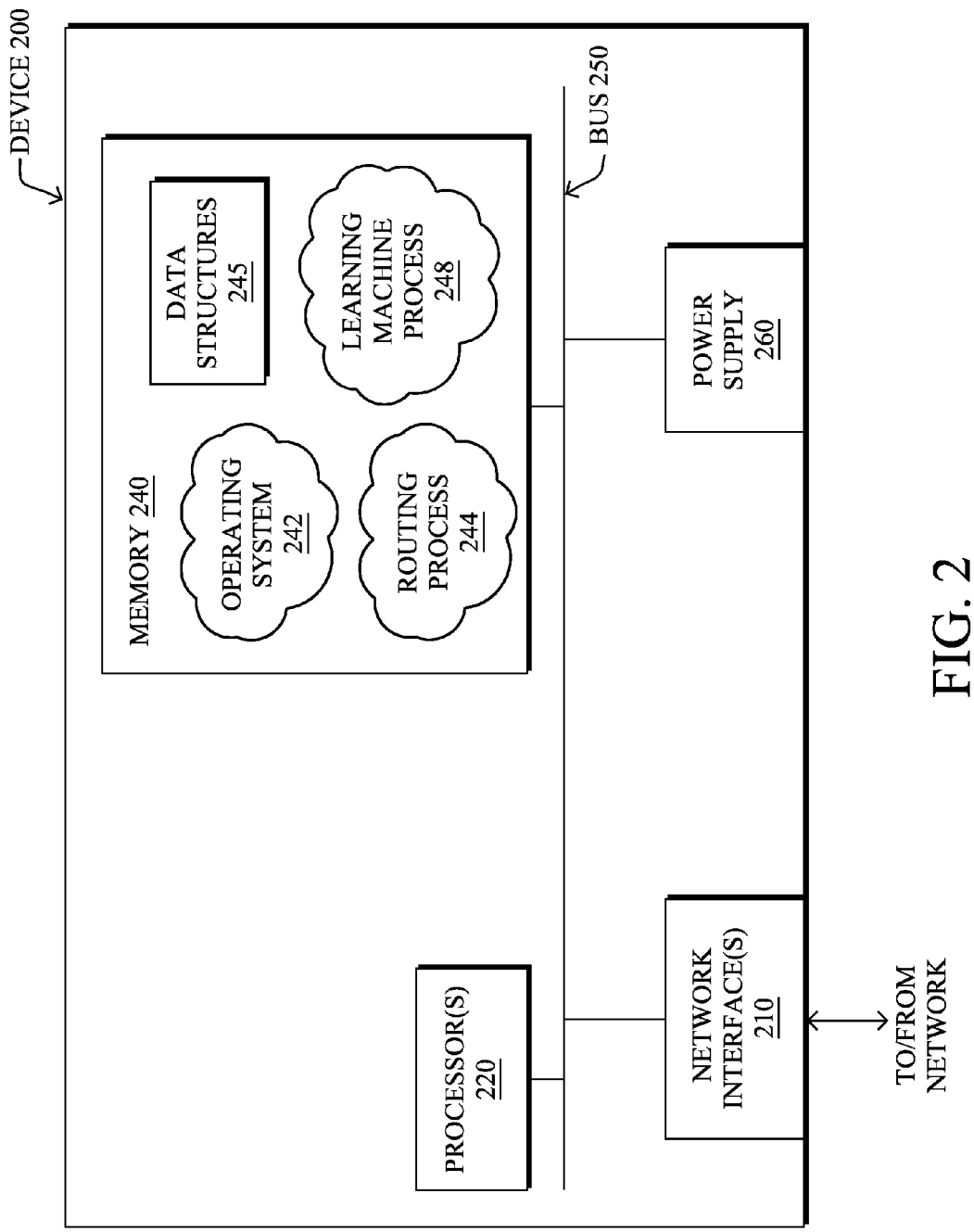

FIG. 2 is a schematic block diagram of an example node/device 200 that may be used with one or more embodiments described herein, e.g., as any of the nodes or devices shown in FIG. 1 above. The device may comprise one or more network interfaces 210 (e.g., wired, wireless, PLC, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links 105 coupled to the network 100. The network interfaces may be configured to transmit and/or receive data using a variety of different communication protocols. Note, further, that the nodes may have two different types of network connections 210, e.g., wireless and wired/physical connections, and that the view herein is merely for illustration. Also, while the network interface 210 is shown separately from power supply 260, for PLC (where the PLC signal may be coupled to the power line feeding into the power supply) the network interface 210 may communicate through the power supply 260, or may be an integral component of the power supply.

The memory 240 comprises a plurality of storage locations that are addressable by the processor 220 and the network interfaces 210 for storing software programs and data structures associated with the embodiments described herein. Note that certain devices may have limited memory or no memory (e.g., no memory for storage other than for programs/processes operating on the device and associated caches). The processor 220 may comprise hardware elements or hardware logic adapted to execute the software programs and manipulate the data structures 245. An operating system 242, portions of which are typically resident in memory 240 and executed by the processor, functionally organizes the device by, inter alia, invoking operations in support of software processes and/or services executing on the device. These software processes and/or services may comprise a routing process/services 244 and an illustrative "learning machine" process 248, which may be configured depending upon the particular node/device within the network 100 with functionality ranging from intelligent learning machine algorithms to merely communicating with intelligent learning machines, as described herein. Note also that while the learning machine process 248 is shown in centralized memory 240, alternative embodiments provide for the process to be specifically operated within the network interfaces 210.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process (services) 244 contains computer executable instructions executed by the processor 220 to perform functions provided by one or more routing protocols, such as proactive or reactive routing protocols as will be understood by those skilled in the art. These functions may, on capable devices, be configured to manage a routing/forwarding table (a data structure 245) containing, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

Notably, mesh networks have become increasingly popular and practical in recent years. In particular, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point such at the root node to a subset of devices inside the LLN) and multipoint-to-point traffic (from devices inside the LLN towards a central control point).

An example implementation of LLNs is an "Internet of Things" network. Loosely, the term "Internet of Things" or "IoT" (or "Internet of Everything" or "IoE") may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid, smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

An example protocol specified in an Internet Engineering Task Force (IETF) Proposed Standard, Request for Comment (RFC) 6550, entitled "RPL: IPv6 Routing Protocol for Low Power and Lossy Networks" by Winter, et al. (March 2012), provides a mechanism that supports multipoint-to-point (MP2P) traffic from devices inside the LLN towards a central control point (e.g., LLN Border Routers (LBRs), FARs, or "root nodes/devices" generally), as well as point-to-multipoint (P2MP) traffic from the central control point to the devices inside the LLN (and also point-to-point, or "P2P" traffic). RPL (pronounced "ripple") may generally be described as a distance vector routing protocol that builds a Directed Acyclic Graph (DAG) for use in routing traffic/packets 140, in addition to defining a set of features to bound the control traffic, support repair, etc. Notably, as may be appreciated by those skilled in the art, RPL also supports the concept of Multi-Topology-Routing (MTR), whereby multiple DAGs can be built to carry traffic according to individual requirements.

Also, a directed acyclic graph (DAG) is a directed graph having the property that all edges are oriented in such a way that no cycles (loops) are supposed to exist. All edges are contained in paths oriented toward and terminating at one or more root nodes (e.g., "clusterheads" or "sinks"), often to interconnect the devices of the DAG with a larger infrastructure, such as the Internet, a wide area network, or other domain. In addition, a Destination Oriented DAG (DODAG) is a DAG rooted at a single destination, i.e., at a single DAG root with no outgoing edges. A "parent" of a particular node within a DAG is an immediate successor of the particular node on a path towards the DAG root, such that the parent has a lower "rank" than the particular node itself, where the rank of a node identifies the node's position with respect to a DAG root (e.g., the farther away a node is from a root, the higher is the rank of that node). Note also that a tree is a kind of DAG, where each device/node in the DAG generally has one parent or one preferred parent. DAGs may generally be built (e.g., by a DAG process and/or routing process 244) based on an Objective Function (OF). The role of the Objective Function is generally to specify rules on how to build the DAG (e.g. number of parents, backup parents, etc.).

Figure 3:
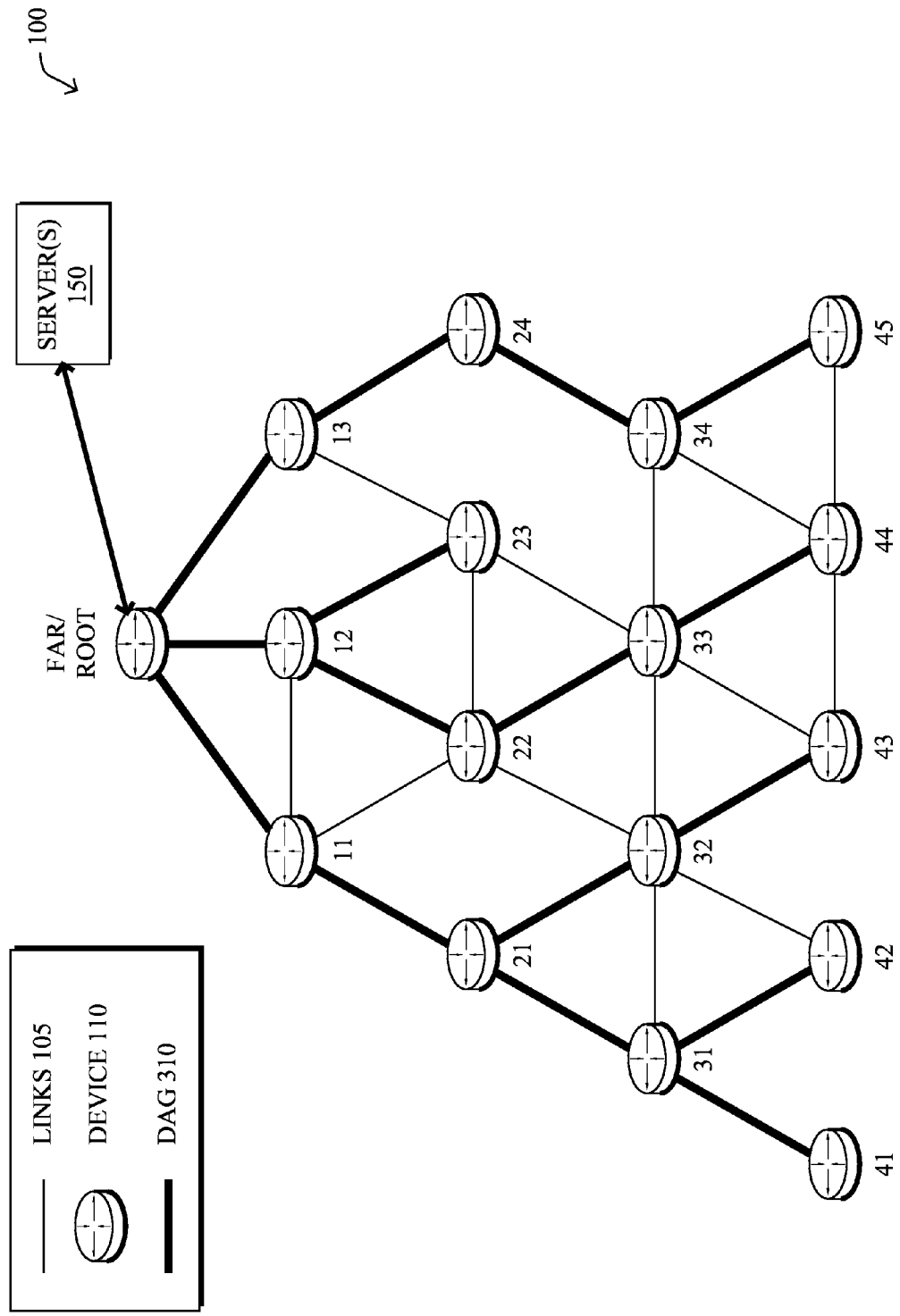
Figure 4A:
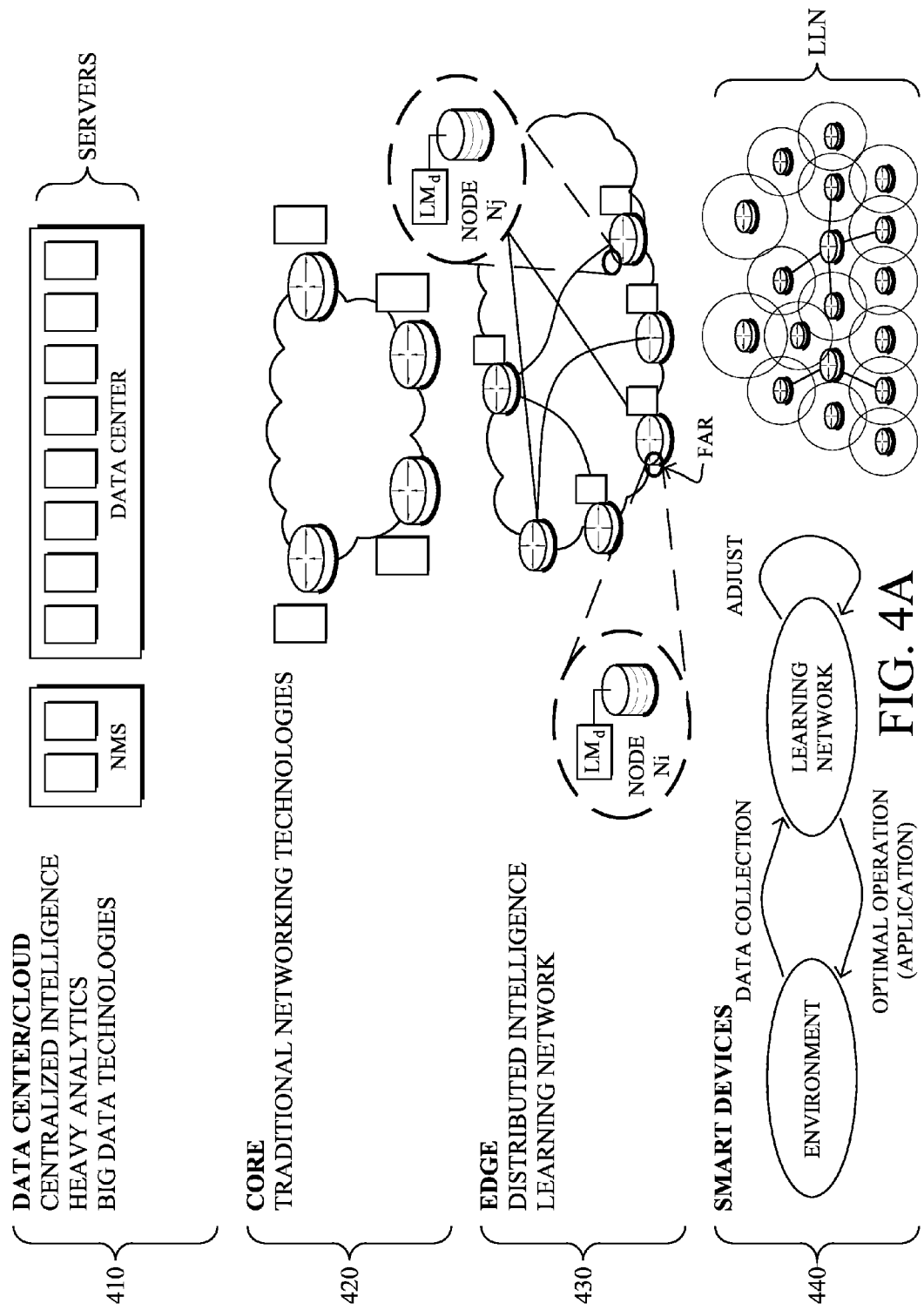
Figure 4C:
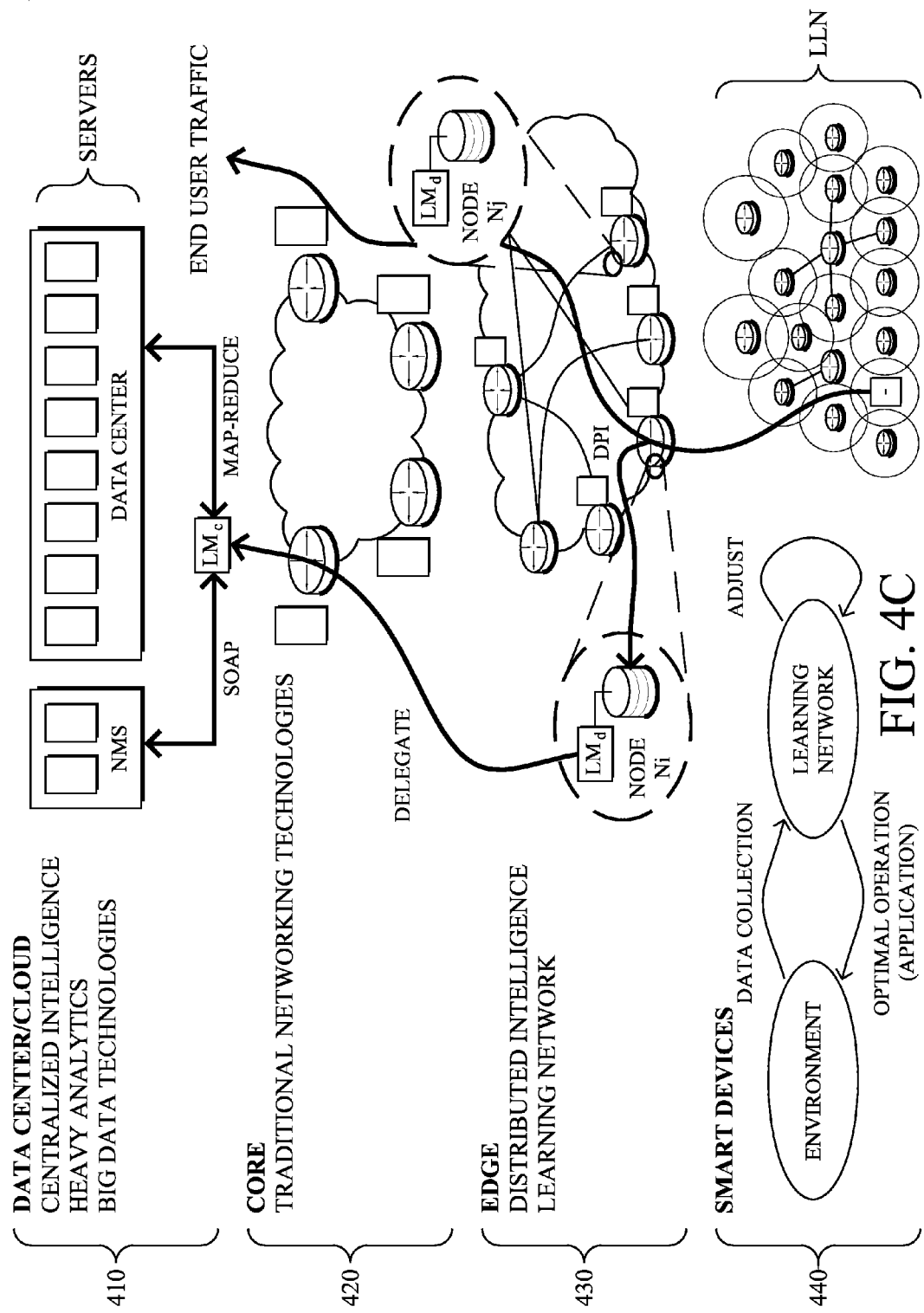
Figure 4D:
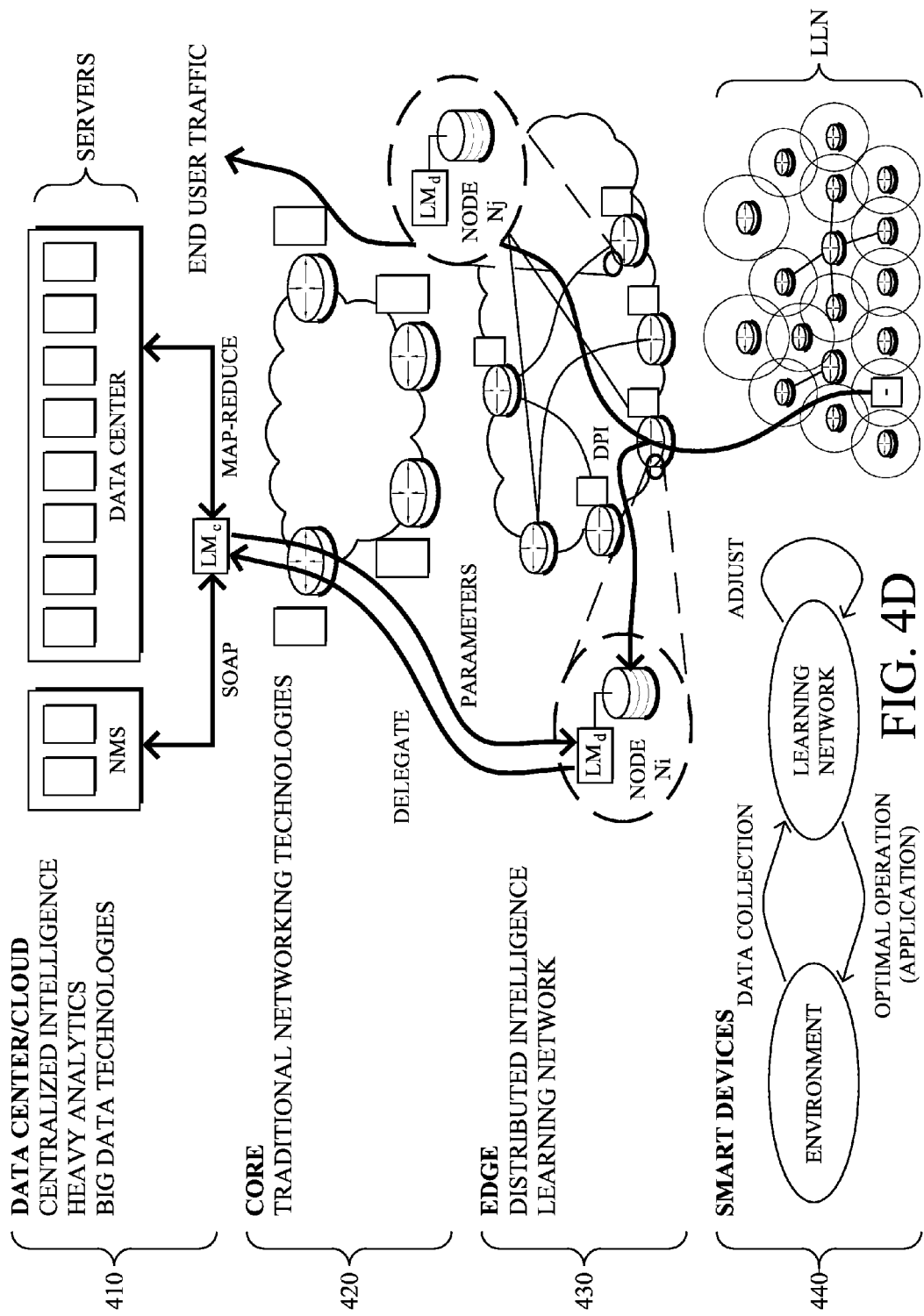
Figure 4E:
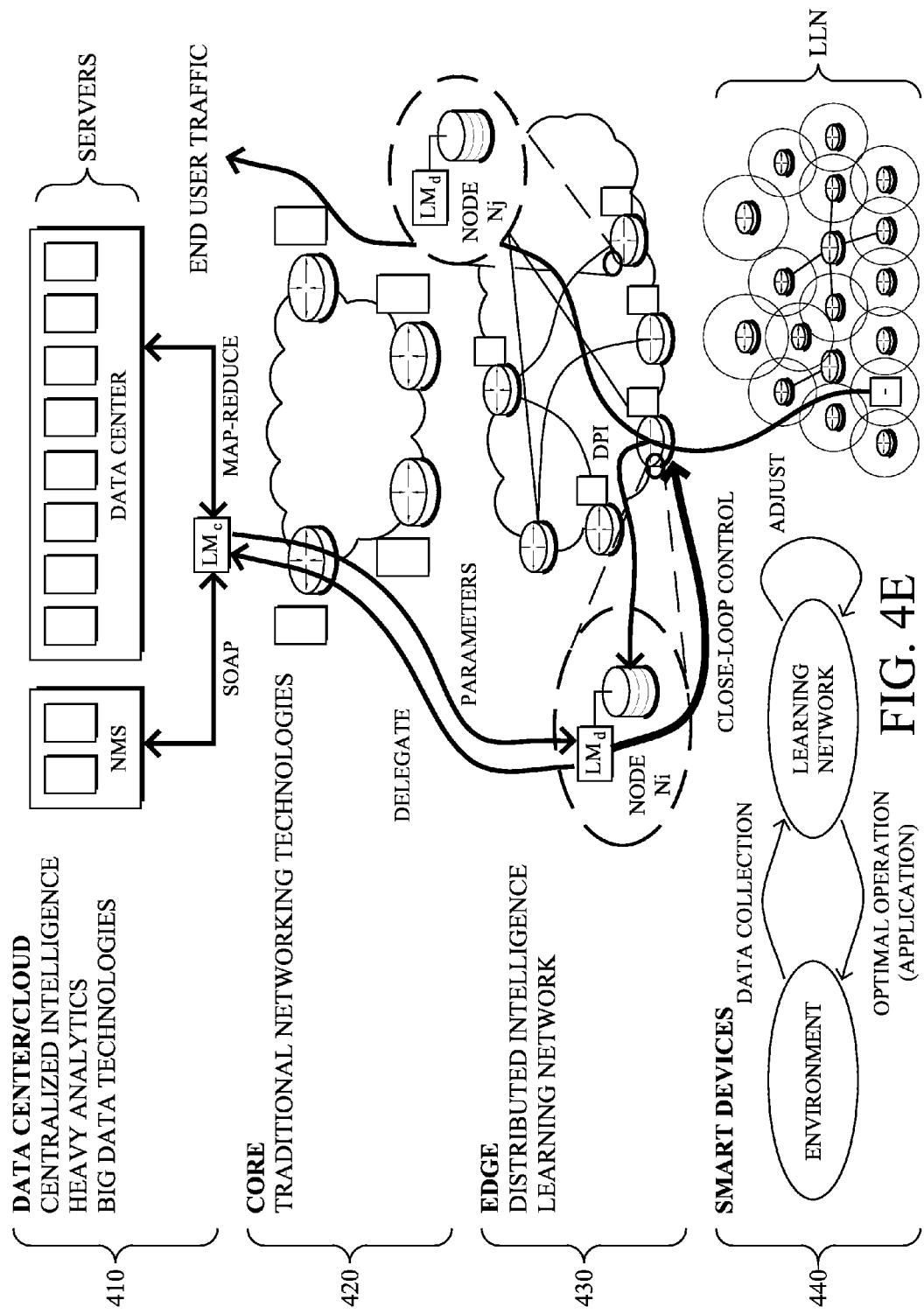

FIG. 3 illustrates an example simplified DAG that may be created, e.g., through the techniques described above, within network 100 of FIG. 1. For instance, certain links 105 may be selected for each node to communicate with a particular parent (and thus, in the reverse, to communicate with a child, if one exists). These selected links form the DAG 310 (shown as bolded lines), which extends from the root node toward one or more leaf nodes (nodes without children). Traffic/packets 140 (shown in FIG. 1) may then traverse the DAG 310 in either the upward direction toward the root or downward toward the leaf nodes, particularly as described herein.

Learning Machine Technique(s)

As noted above, machine learning (ML) is concerned with the design and the development of algorithms that take as input empirical data (such as network statistics and state, and performance indicators), recognize complex patterns in these data, and solve complex problem such as regression thanks to modeling. One very common pattern among ML algorithms is the use of an underlying model M, whose parameters are optimized for minimizing the cost function associated to M, given the input data. For instance, in the context of classification, the model M may be a straight line that separates the data into two classes such that M=a*x+b*y+c and the cost function would be the number of misclassified points. The ML algorithm then consists in adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

As also noted above, learning machines (LMs) are computational entities that rely one or more ML algorithm for performing a task for which they haven't been explicitly programmed to perform. In particular, LMs are capable of adjusting their behavior to their environment. In the context of LLNs, and more generally in the context of the IoT (or Internet of Everything, IoE), this ability will be very important, as the network will face changing conditions and requirements, and the network will become too large for efficiently management by a network operator. Thus far, LMs have not generally been used in LLNs, despite the overall level of complexity of LLNs, where "classic" approaches (based on known algorithms) are inefficient or when the amount of data cannot be processed by a human to predict network behavior considering the number of parameters to be taken into account.

FIGS. 4A-4E describe a distributed architecture where a set of Learning Machines (called LM_d) is hosted on various network elements at the edge of network such as Field Area Routers (FAR) that connect Low power and Lossy Networks (LLNs) also referred to the IoT to the core IP network.

An instantiation of this architecture is described in U.S. patent application Ser. No. 13/941,063, entitled "Dynamically Adjusting a Set of Monitored Network Properties Using Distributed Learning Machine Feedback", filed by Vasseur et al. on Jul. 12, 2013, that specifies a set of algorithms and protocols for LM_d to dynamically modify the set of monitored network properties (instead of using a brute force monitoring approach) using LM-based algorithms and interacting with the Network Management System (NMS).

It is worth reminding the following set of challenges and properties of these IoT LM based architecture that are unique in contrast with the usual centralized approach applicable to various Internet services (e.g. voice recognition, search engines, etc.):

Distributed computing is very important: FARs are usually connected to the core IP network with low bandwidth and unreliable links such as 3G, etc.

Scalability is a very strong requirement: indeed, the IoT is made of a very large number of objects, an order of magnitude larger than in the current Internet (several millions for a single city and one application): forwarding data from the IoT without data processing does not scale.

Response time is another requirement that implies decision making as close as possible to the edge.

These requirements come with their own challenges; indeed, distributing data processing (both at the application and network level) implies a sophisticated architecture for which one critical challenge is the distribution of tasks processing across a set of resources (e.g., multiple Virtual Machines hosted on multiple FARs capable of providing different levels of computation). Indeed, although some LM algorithm such as HMM (Hidden Markov Model/Chain) or VBLS (Variational Bayes Least Square) may be hosted requiring "reasonable" resources in terms of CPU and memory on a FAR, they may require to be hosted on a more powerful FAR or processor in the network such as a CPU blade on a high-end router. Even if the task T can be hosted on a FAR X, this specific FAR may run low in terms of resources thus requesting the task T to be temporarily offloaded and hosted on a remote FAR Y.

The techniques herein specify a new model where a central decision control point is used for FAR selection to which computation tasks will be offloaded. This decision control point, called the OCS (Off-load Computation Selection engine), directs off-loading of LM computation requests to a set of LM_d as described in detail below. Selection of which LM_d to offload to is in turn also determined using a LM algorithm that is running on the OCS. In order words, instead of enabling resource discovery among a set S of LM_d in order to help a FAR determine which other FAR Y could host the computation of a LM task T, the techniques use a different approach where the OCS will dynamically learn the most appropriate FAR that can serve that request.

Said differently, in contrast with existing resource discovery approaches, the techniques herein specify a new architecture whereby a central decision control point (called the OCS) dynamically learns the capabilities of a set of computing nodes in a network using a learning machine. When a node Ni in the network is not capable of running a task T (that may itself be a learning machine but is not necessarily be) the node sends a newly defined message to the OCS in order to determine which node in the network could (temporarily) host the task T. The LM hosted by the OCS is fed by past experience of successful task completion coupled with network based parameters (location of the nodes, network bandwidth, etc.) in order to perform the selection of the helping node based on the LM output and network characteristics. Such an approach radically contrasts with existing approaches since it relies on a central decision point that makes use of a learning machine instead of relying on resource discovery that is ill-suited to constrained networks such as the Internet of Things.

In one embodiment, a request is received from a requesting node in a network to assist in distributing a task of the requesting node. Upon receiving the message, a capability to perform the task of one or more helping nodes in the network is evaluated, and a helping node of the one or more helping nodes is selected to perform the task based on the evaluated capability of the selected helping node. The distribution of the task is then authorized from the requesting node to the selected helping node.

Illustratively, the techniques described herein may be performed by hardware, software, and/or firmware, such as in accordance with the learning machine process 248, which may contain computer executable instructions executed by the processor 220 (or independent processor of interfaces 210) to perform functions relating to the techniques described herein, e.g., optionally in conjunction with other processes. For example, certain aspects of the techniques herein may be treated as extensions to conventional protocols, such as the various communication protocols (e.g., routing process 244), and as such, may be processed by similar components understood in the art that execute those protocols, accordingly. Also, while certain aspects of the techniques herein may be described from the perspective of a single node/device, embodiments described herein may be performed as distributed intelligence, also referred to as edge/distributed computing, such as hosting intelligence within nodes 110 of a Field Area Network in addition to or as an alternative to hosting intelligence within servers 150.

Figure 5:
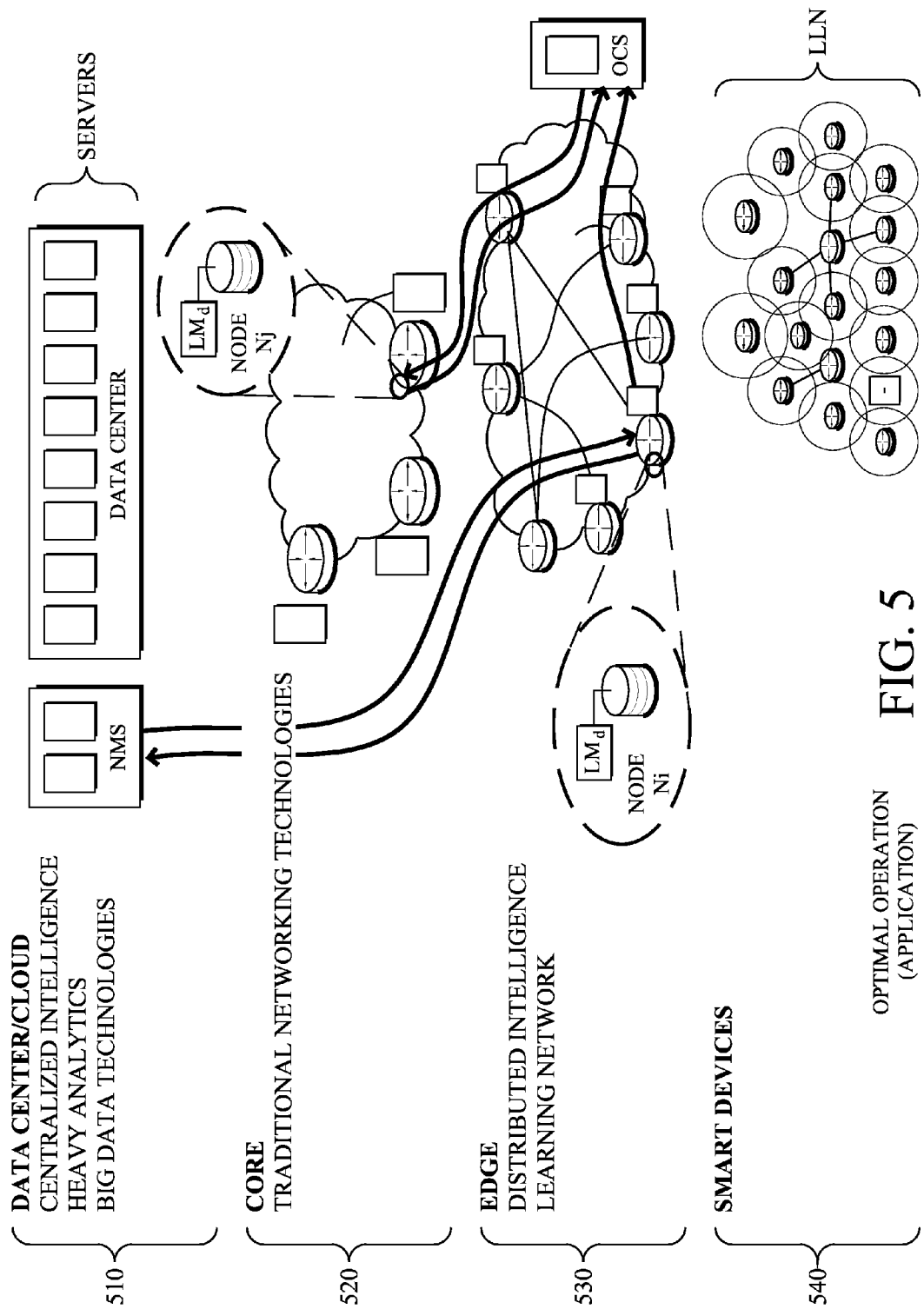

Operationally, the various components of the techniques herein involve several network elements, as illustratively depicted in FIG. 5:

Node Ni: by node Ni, the disclosure refers to a computing node that can be hosted on an edge router such as a FAR, a higher end router (e.g., a blade on the high-end router) or a dedicated system. Note that although the node Ni could also be a server in a Data Center, these applications may generally involve network hosted servers, deeper in the network. These nodes could either be dedicated nodes only handling computations of others, or they could be serving other functional purposes. For example, a FAR could be the root of a fully functional multi-service PAN with thousands of nodes in addition to helping out a helping FAR with computation by sharing is resources.

NMS: used to handle registration, OCS discovery and policy.

The OCS (Off-load Computation Selection engine) is a central component of this architecture that makes use of LM-based algorithm to answer requests coming from a requesting Ni in order to help with the off-load of a task T on a remote node Nj (also called the "helping" node).

Figure 6:
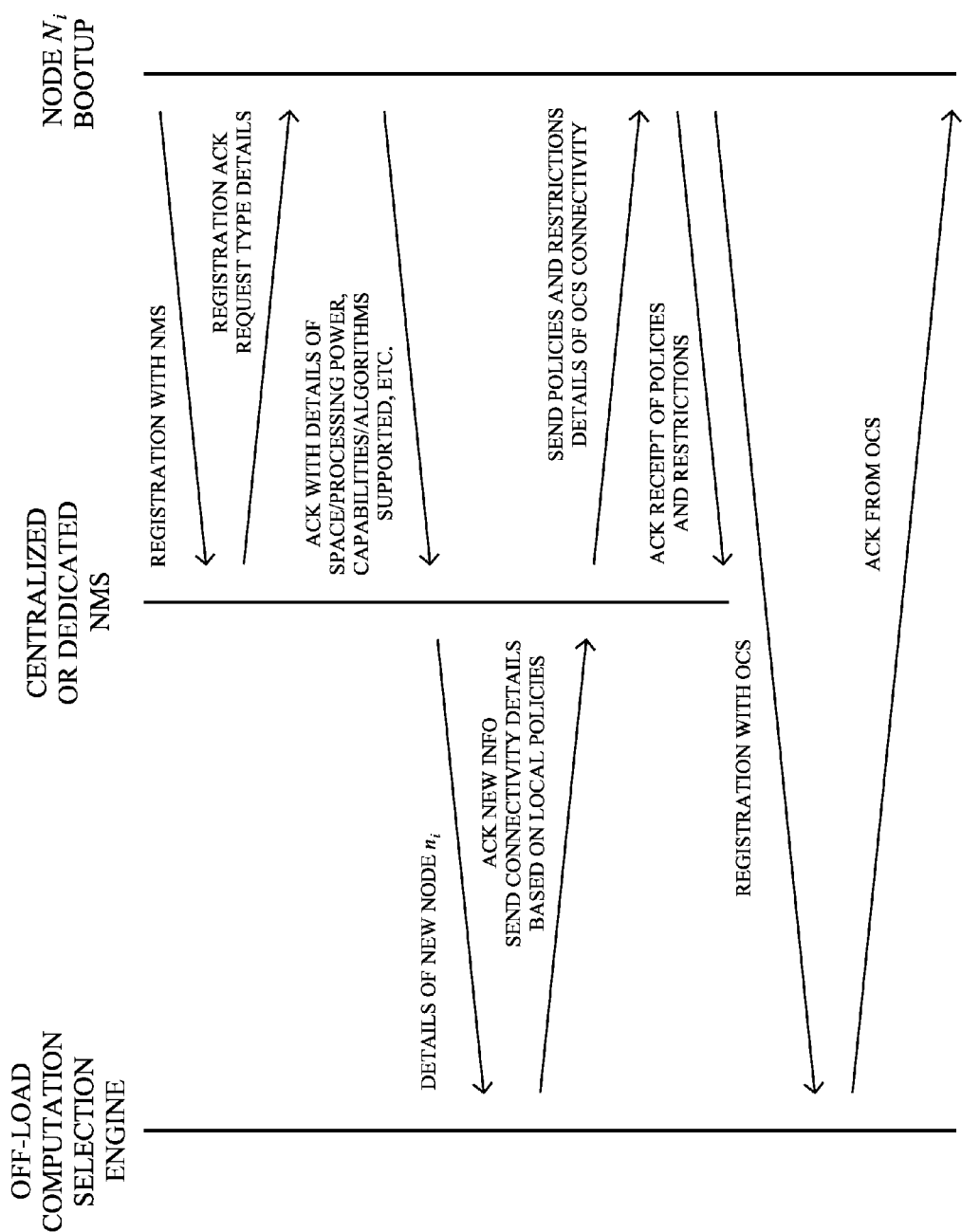

A first aspect of the techniques herein relates to the use of the NMS in order to control policy: upon booting up, a node Ni would be configured with a number of parameters. A new parameter is introduced that allows a Node Ni to advertise a set of available resources such as the CPU, memory, etc. to mention a few parameters. Note that a node Ni may be using a dedicated VM (Virtual Machine) to handle computation requests from others and only advertise a subset of its total resources available to handle tasks from other nodes in the network. A second message is specified that allows the network operator to enforce policy on each node Ni. This message would be used by the NMS to indicate to a node Ni whether it should act as a helping node, the set of algorithms that could be used on the said node (including the code that the NMS may dynamically upload on the node Ni), etc. Policy is generally a must-have since the NMS may require a node not to act as a helping node or to only support a specific set of algorithms. The sequence of message exchanges is illustrated in FIG. 6.

A second aspect of the techniques herein is the OCS itself. As explained above, the usual approach consisting in discovering the set of available resources in the network coupled with a local selection algorithm is ill-suited to IoT architectures. In contrast, the techniques herein introduce an architectural component called the OCS that is used by requestor (Node Ni requiring to off-load a task T on a helping node) in order to intelligently select a remote node Ni (helping node) thanks to historical data (past computation, capabilities, etc.) consumed by a learning machine hosted on the OCS.

There are several embodiments possible for discovering the OCS. The OCS discovery (e.g., a very lightweight and static process) is either performed manually thanks to the NMS or each Node Ni may dynamically discover (one or more) OCS using newly defined DHCP extensions allowing the node to discover a set of OCS that can be used to perform helping node selection. Also, the NMS can control based on policy, which OCS is applicable to be discovered by which node.

Algorithmically, the first step takes place when a node Ni cannot handle a task T because of insufficient local resources. For the sake of illustration, U.S. patent application Ser. No. 13/941,063 specifies an architecture/algorithm whereby a FAR hosts a Learning Machine used to dynamically determine a required set of monitored network attributes interacting with a NMS. Running such an LM-based algorithm may be CPU intensive should the set of features be large. In other circumstances LMs may require to perform highly computational intensive tasks that cannot be hosted on a low-end node. Note that a node may only temporarily be unable to perform a task T. Indeed, various events may take place on a node Ni that makes it not capable of performing the task T. For example, if a new CPU-intensive task such as the encryption of a large set of tunnels be triggered on the node Ni, Ni may request for help to handle the task T for a period of time before getting back to its normal mode of operation. Once the node Ni determines that it cannot perform the task T, it triggers the following set of actions:

Scoping: Ni determines in the type of algorithm required for T (e.g., use of the VBLS algorithm, PCA, HMM, etc), input size (amount of data required to perform the task T such as the routing topology, various network performance metrics, a traffic matrix, etc.); and SLA: the node Ni may require the task T to be completed within X milliseconds (note that in many circumstances, the task T may not require bounded computation times).

A newly defined message called the Remote Helping Node Selection Request (RHNSR) message may be sent by the node Ni (requester node) to the OCS used to request the OCS to perform a helping node selection (indicating which remote node can perform the task T). The RHNSR message comprises the output of the scoping process described above (e.g., the task T requires a helping node capable of running the HMM algorithms with the following set of features F, the task T must be completed in X ms, etc). Additionally, a job number Ji dynamically assigned by the node Ni may be carried within the RHNSR message sent to the OCS.

Upon receiving the RHNSR message from the Node Ni, the OCS inspects its local database D. D is fed by feedback received from past successful completion of tasks by the set of helping nodes in the network. One of the key aspects of the techniques herein lies in the use of a Learning Machine on the OCS in order to determine the most appropriate helping node for a required task T. D is fed by each node in the network where an entry comprises the type of task that was previously performed for each node along with its characteristics: type of algorithm, running time, size of input, granularity of output required (iterations of the algorithm to run), running time, CPU usage, memory usage, etc. In other words, the techniques herein use an LM algorithm that takes into account past successful and failed computations in order to dynamically select the node that can perform a task T upon receiving a request from the node Ni to handle this task. The helping node selection algorithm makes use of the regression function coupled with other network related parameters such as the location of the requestor and helping node. To that end, the OCS is connected to the network (for example, it may act as a passive router running the ISIS algorithm with the Overload bit set in order to passively retrieve the Link State Database of the network). For the sake of illustration, the OCS may preferably select a helping node Nj located close to the requestor in order to limit the network resources used when the node Ni will hand off the task T to the node Nj. The OCS can also keep in mind link and connectivity statistics so that the requester node can get the best possible QoS from the helper node. In the long run, using the state of the network as a data point to select helper nodes will make things more efficient as well.

As another example, if two nodes Ni and Nj are effectively connected to the same PAN, it is desirable for the OCS to select (if possible) a helping node connected to the same PAN since the helping node will then have access to the number of network states required to perform the task T.

Figure 7:
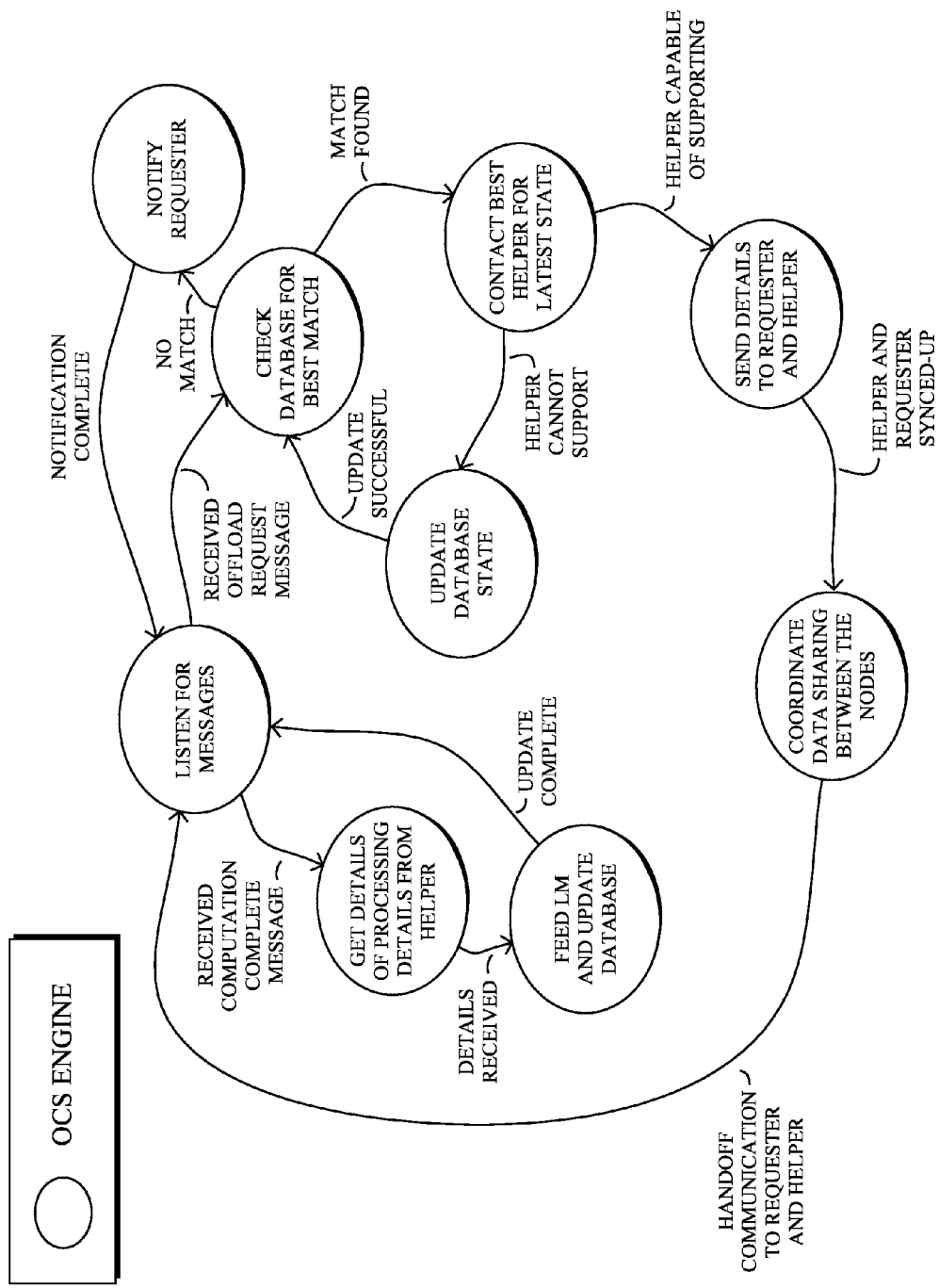

Details of the functionality at the OCS is illustrated in FIG. 7. Note that in FIG. 7, the step "Contact best helper for latest state" is optional.

The LM responsible for the helping node selection is basically a recommender system: when a node Ni requests to offload a given task T, the LM selects a node Nj (or a node similar to it) for which requesters similar to Ni have been most satisfied for the same task T, also taking into account network related performance metrics. Several algorithms can be used to perform this selection, such as Principal Component Analysis, similarity-based clustering, or predictive analytics based on regression methods.

Figure 8:
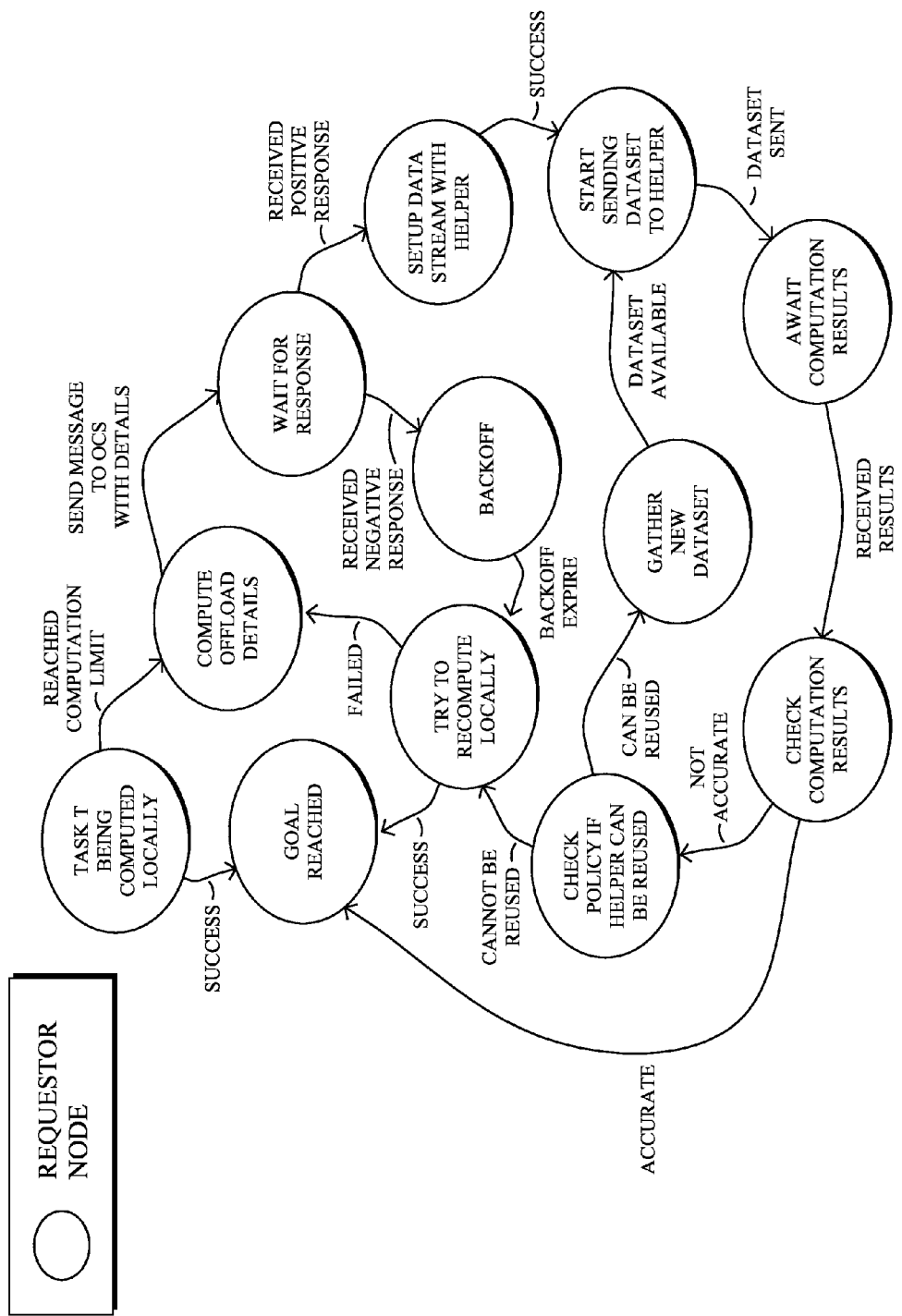

Once the helping node has been selected a second novel message called the Remote Helping Node Selection Answer (RHNSA) it sent back to the Node Ni that indicates the IP address of the helping node, at which point the task T is handed off to the node Nj. Details of how the process that takes place on the requester node is illustrated in FIG. 8.

A computation report (CR) is a newly specified unicast message sent by a helping node Ni to the OCS to inform of the successful completion of a task T. The CR may comprise the running time in addition to the job number. As pointed out earlier, when sending a RHNSQ message the task is characterized thanks to several attributes (type of algorithm, input size, etc.). Upon receiving these characteristics, the OCS performs the helping node selection and sends a reply back to the requestor; at this point the task's characteristics are stored by the OCS (along with the job number) for a period of time T (where T is a dynamic timer equal to the estimated time for the selected node Nj to complete the task T multiplied by some factor). Once the task T is performed a CR is sent back to the OCS that retrieves the job number (used as a pointer to the set of characteristics of T). The CR is then used to feed the LM engine that takes into account all the features of the computation and then updates the database D that comprises the set of task successfully handled, with their corresponding characteristics and running times along with the identity of the helping node.

In yet another embodiment, a node Ni completing a local task T may send an unsolicited CR to the OCS for all locally handled tasks. Such reports can then be used to further enrich the database D and help building the regression function of the LM used by the OCS.

In yet another embodiment, the OCS records the predicted running time for the task T and compares the predicted running time with the actual running time reported in the CR. If the level of confidence gets high for a node Nj the OCS may indicate to the node Ni to temporary stop sending reports.

Figure 9:
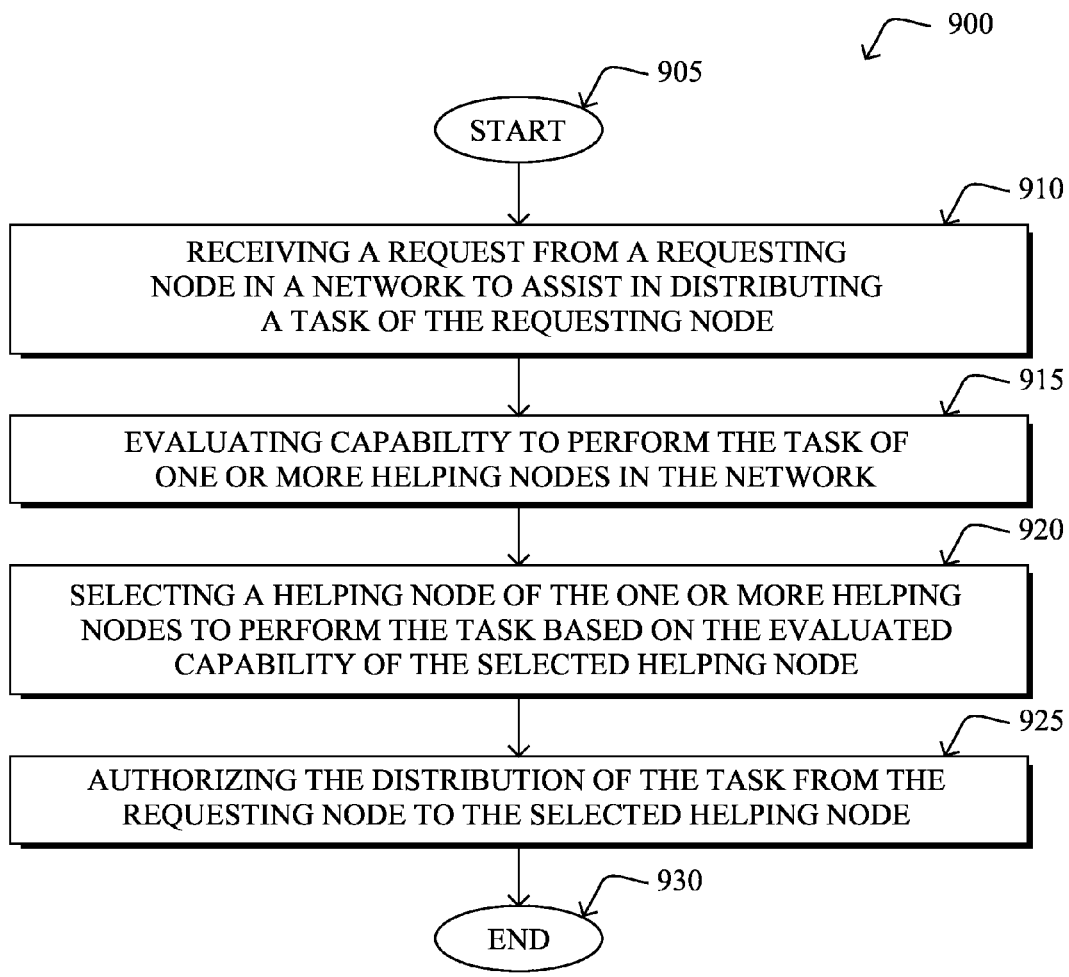

FIG. 9 illustrates an example simplified procedure for machine learning based computation using a decision control point. As shown in FIG. 9, the procedure 900 may start at step 905, continue to step 910, and so forth, where, as described in greater detail above, a request to assist in distributing a task is received, and a helping node is selected to which the task should be distributed.

At Step 910, the procedure 900 includes receiving a request from a requesting node in a network to assist in distributing a task of the requesting node. Upon receiving the request, at Step 915, a capability to perform the task of one or more helping nodes in the network is evaluated. At Step 920, a helping node of the one or more helping nodes is then selected to perform the task based on the evaluated capability of the selected helping node. At Step 925, the distribution of the task from the requesting node to the selected helping node is authorized. The procedure 900 illustratively ends at Step 930. The techniques by which the steps of procedure 900 are performed, as well as ancillary procedures and parameters, are described in detail above.

It should be understood that the steps shown in FIG. 9 are merely examples for illustration, and certain steps may be included or excluded as desired. Further, while a particular order of the steps is shown, this ordering is merely illustrative, and any suitable arrangement of the steps may be utilized without departing from the scope of the embodiments herein.

The techniques described herein, therefore, provide for a distributed architecture for machine learning based computation using a decision control point. In particular, the techniques herein allow for performing remote handling of tasks that cannot be locally perform on a FAR. Notably, using current technologies/architecture, if a FAR cannot handle a task it would simply send a notification of the NMS or locally log the failure. According to the techniques herein, however, tasks are dynamically distributed in the network according to the available resource with minimal overhead thanks to the use of a learning machine on the central off-load decision engine.

While there have been shown and described illustrative embodiments that provide for a distributed architecture for machine learning based computation using a decision control point, it is to be understood that various other adaptations and modifications may be made within the spirit and scope of the embodiments herein. For example, the embodiments have been shown and described herein with relation to LLNs and related protocols. However, the embodiments in their broader sense are not as limited, and may, in fact, be used with other types of communication networks and/or protocols. In addition, while the embodiments have been shown and described with relation to learning machines in the specific context of communication networks, certain techniques and/or certain aspects of the techniques may apply to learning machines in general without the need for relation to communication networks, as will be understood by those skilled in the art.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
    receiving at a centralized network device, a request sent from a requesting node in a network to assist the requesting node in distributing a task of the requesting node that the requesting node is not capable of running;
    in response to receiving the request, evaluating, based on a Learning Machine-based algorithm executing on the centralized network device, a plurality of nodes to identify one or more helping nodes of the plurality of nodes that are capable of performing the task;
    selecting, based on results of the Learning Machine-based algorithm, a helping node of the one or more helping nodes to perform the task based on the evaluated capability of the selected helping node; and authorizing, by the centralized network device, the distribution of the task from the requesting node to the selected helping node, wherein the helping node temporarily hosts the task until the task is completed.

2. The method according to claim 1, wherein the evaluating plurality of nodes to identify the one or more helping nodes of the plurality of nodes that are capable of performing the task comprises:

evaluating historical data relating to a particular helping node.

3. The method according to claim 2, wherein the historical data includes one or more of: information relating to a previous task performed by the particular helping node, an indication of success or failure of the previous task, or a degree of confidence associated with the particular helping node.

4. The method according to claim 2, further comprising:
storing the historical data in a local database; and
when evaluating the historical data relating to the particular helping node, accessing the historical data from the local database.

5. The method according to claim 1, wherein the evaluating the plurality of nodes to identify the one or more helping nodes that are capable of performing the task comprises:

evaluating information specified in the received request.

6. The method according to claim 5, wherein the information specified in the received request includes one or more of: a period of time during which the task is to be performed, an indication of type of the task, a resource necessary to perform the task, or a network performance metric.

7. The method according to claim 1, wherein the evaluating the plurality of nodes to identify the one or more helping nodes that are capable of performing the task comprises:

evaluating a network-based parameter relating to the network or a particular helping node.

8. The method according to claim 1, wherein the authorizing of the distribution of the task comprises:
sending a message to the requesting node indicating an identity of the selected helping node.

9. The method according to claim 1, further comprising:
receiving a message from the selected helping node indicating a completion of the task.

10. The method according to claim 8, further comprising:
storing information related to the completed task in a local database.

11. The method according to claim 1, further comprising:
predicting an amount of time for the selected helping node to complete the task;
comparing the predicted amount of time to an actual amount of time for the selected helping node to complete the task; and
determining a degree of confidence associated with the selected helping node based on the comparison.

12. An apparatus, comprising:
one or more network interfaces that communicate with a network;
a processor coupled to the one or more network interfaces and configured to execute a process; and
a memory configured to store program instructions which contain the process executable by the processor, the process comprising:

receiving a request sent from a requesting node in the network to assist the requesting node in distributing a task of the requesting node that the requesting node is not capable of running;

in response to receiving the request, evaluating, based on a Learning Machine-based algorithm executing on the apparatus, a plurality of nodes to identify one or more helping nodes of the plurality of nodes that are capable of performing the task;

selecting, based on results of the Learning Machine-based algorithm, a helping node of the one or more helping nodes to perform the task based on the evaluated capability of the selected helping node; and authorizing the distribution of the task from the requesting node to the selected helping node, wherein the helping node temporarily hosts the task until the task is completed.

13. The apparatus according to claim 12, wherein the evaluating the plurality of nodes to identify the one or more helping nodes of the plurality of nodes that are capable of performing the task comprises:

evaluating historical data relating to a particular helping node.

14. The apparatus according to claim 13, wherein the historical data includes one or more of: information relating to a previous task performed by the particular helping node, an indication of success or failure of the previous task, or a degree of confidence associated with the particular helping node.

15. The apparatus according to claim 13, wherein the process further comprises:
storing the historical data in a local database; and
when evaluating the historical data relating to the particular helping node, accessing the historical data from the local database.

16. The apparatus according to claim 12, wherein the evaluating the plurality of nodes to identify the one or more helping nodes of the plurality of nodes that are capable of performing the task comprises:

evaluating information specified in the received request.

17. The apparatus according to claim 16, wherein the information specified in the received request includes one or more of: a period of time during which the task is to be performed, an indication of type of the task, a resource necessary to perform the task, or a network performance metric.

18. The apparatus according to claim 12, wherein the evaluating the plurality of nodes to identify the one or more helping nodes of the plurality of nodes that are capable of performing the task comprises:

evaluating a network-based parameter relating to the network or a particular helping node.

19. The apparatus according to claim 12, wherein the authorizing of the distribution of the task comprises:
sending a message to the requesting node indicating an identity of the selected helping node.

20. The apparatus according to claim 12, wherein the process further comprises:
receiving a message from the selected helping node indicating a completion of the task.

21. The apparatus according to claim 20, wherein the process further comprises:
storing information related to the completed task in a local database.

22. The apparatus according to claim 12, wherein the process further comprises:
   predicting an amount of time for the selected helping node to complete the task;
   comparing the predicted amount of time to an actual amount of time for the selected helping node to complete the task; and
   determining a degree of confidence associated with the selected helping node based on the comparison.

23. A tangible non-transitory computer readable medium storing program instructions that cause a computer to execute a process, the process comprising:
   receiving a request sent from a requesting node in a network to assist the requesting node in distributing a task of the requesting node that the requesting node is not capable of running;
   in response to receiving the request, evaluating, based on a Learning Machine-based algorithm, a plurality of nodes to identify one or more helping nodes of the plurality of nodes that are capable of performing the task;
   selecting, based on results of the Learning Machine-based algorithm, a helping node of the one or more helping nodes to perform the task based on the evaluated capability of the selected helping node; and
   authorizing the distribution of the task from the requesting node to the selected helping node, wherein the helping node temporarily hosts the task until the task is completed.

* * * * *